H. BALL.
Oven.

No. 15,753.

Patented Sept. 23, 1856.

UNITED STATES PATENT OFFICE.

H. BALL, OF NEW YORK, N. Y.

OVEN.

Specification forming part of Letters Patent No. 15,753, dated September 23, 1856; Reissued October 12, 1869, No. 3,666.

*To all whom it may concern:*

Be it known that I, HOSEA BALL, of the city, county, and State of New York, have invented a new and useful Improvement in Bake-Ovens; and I do hereby declare that the following is a full, clear, and exact description of the construction and operation of the same, reference being had to the annexed drawing, forming part of this specification, in which—

Figure 2:
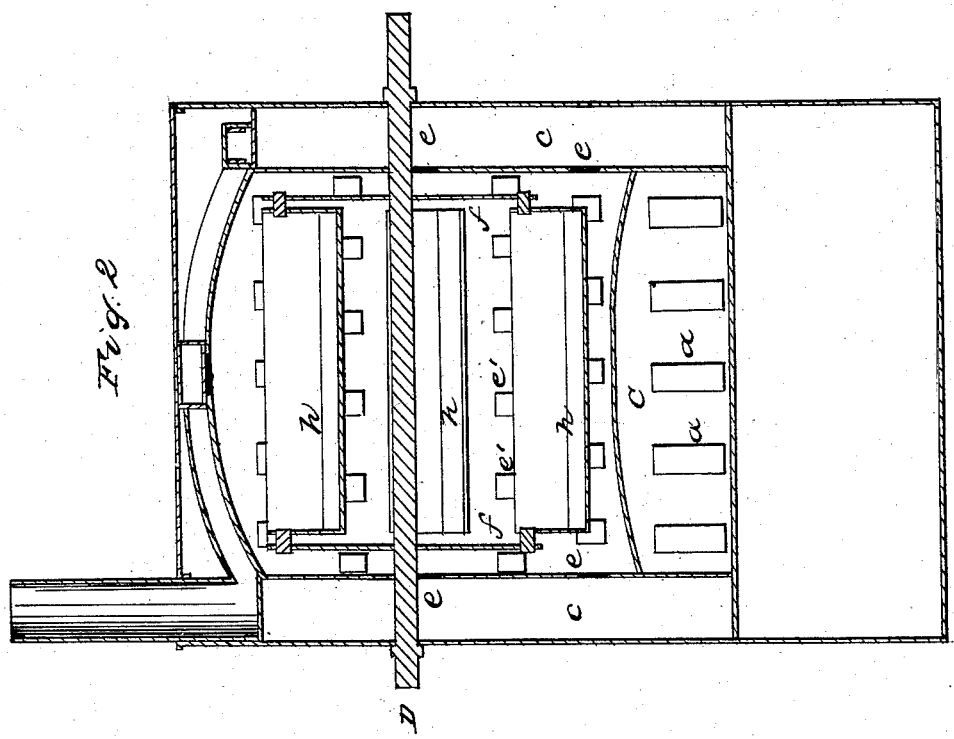
Figure 1:
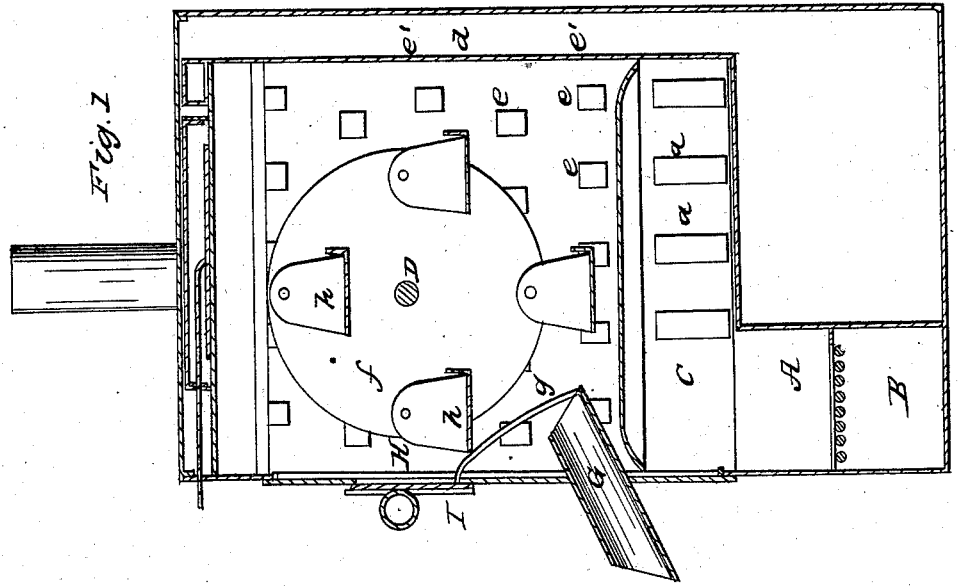

Figure 1 is a vertical section of the oven taken perpendicular to the axis of reel, Fig. 2 is a vertical section through the axis of reel.

Similar letters of reference in the several figures denote the same part of the oven.

The nature of my invention consists in constructing the oven with a series of bread receivers swung between the ends of a reel, which is hung in an interior perforated chamber, and is capable of rotation on a horizontal shaft; an arrangement being provided for the self delivery of the bread from the front of the oven, as will be hereinafter set forth.

In the drawing A is the fire chamber.

B is the ash pit.

The space C above the fire chamber, communicates by openings $a$ with the vertical side and back flues $c$ and $d$, which communicate with the interior chamber by the openings $e$ and $e'$. Across the oven runs the shaft D, to which are secured the plates $f$, so as to constitute a reel within the interior chamber. Between the plates $f$, are hung a series of platforms $h$ which will remain horizontal in all positions of the reel, the number depending on the diameter of the reel.

In the front of the oven is a chute G leading from the interior outward, on the inner extremity of which are guides $g$, against which the edges of the platforms $h$ will come in contact, as the reel revolves.

Above the chute G is the opening H for supplying bread to the oven. It is closed by a sliding door I. The chute will also have a suitable door for closing it during the baking. The platforms $h$ are each in succession brought opposite opening H, by the rotation of shaft D, and a supply of bread placed upon them. All doors are then closed, and the baking commenced. Owing to the perforated sides and back of the interior chamber, all parts of it receive the full heat of the oven; suitable dampers regulating the course of the products of combustion to the chimney.

When the baking is completed the reel is revolved, causing the front edge of each platform, to come in contact with the guides $g$, and by the depression thus produced causing the platform to assume the angle of the chute and discharge its load thereon; whence it passes to a receiver outside of the oven.

By this construction all parts of the interior chamber are rendered available for baking purposes, the lower part as well as the upper; the construction of the baking chamber causing all parts to be equally well heated. The swinging platforms moreover favor economy of space in the construction of the oven.

What I claim and desire to secure by Letters Patent, is—

The perforated interior chamber in combination with the rotary reel and the swinging platforms thereon, self discharging substantially as set forth.

In testimony whereof, I have hereunto signed my name before two subscribing witnesses.

HOSEA BALL.

Witnesses:
GEO. PATTEN,
JOHN S. HOLLINGSHEAD.